United States Patent [19]

Goldstein et al.

[11] Patent Number: 4,850,602
[45] Date of Patent: Jul. 25, 1989

[54] FLUID SEAL AND ROD WIPER ASSEMBLY

[75] Inventors: Clifford W. Goldstein, Boulder, Colo.; Mark A. Krzemien, Churubusco; Jay Witte, Decatur, both of Ind.

[73] Assignee: W. S. Shamban & Company, Santa Monica, Calif.

[21] Appl. No.: 126,558

[22] Filed: Nov. 30, 1987

[51] Int. Cl.⁴ ............................................. F16J 15/32
[52] U.S. Cl. ................................. 277/205; 277/188 A
[58] Field of Search ................... 277/205, 207 R, 121, 277/179, 181–186, 152, 153, 188 A, 188 R; 384/145

[56] References Cited

U.S. PATENT DOCUMENTS

| | | | |
|---|---|---|---|
| 2,731,284 | 1/1956 | Chambers et al. | 277/179 |
| 2,898,167 | 8/1959 | Tanner | 277/152 |
| 3,003,799 | 10/1961 | Marchiond et al. | 277/182 |
| 3,601,419 | 8/1971 | Fern | 277/205 |
| 3,848,881 | 11/1974 | Ginn | 277/181 |
| 3,901,517 | 8/1975 | Heathcott | 277/205 |
| 3,921,991 | 11/1975 | Beck | 277/205 |
| 3,957,278 | 5/1976 | Rabe | 277/205 X |
| 4,013,299 | 3/1977 | Scott | 277/188 R X |
| 4,566,702 | 1/1986 | Traub | 277/121 |

FOREIGN PATENT DOCUMENTS

| | | | |
|---|---|---|---|
| 776506 | 6/1957 | United Kingdom | 277/182 |
| 1142265 | 2/1969 | United Kingdom | 277/188 A |

Primary Examiner—Donald A. Griffin
Attorney, Agent, or Firm—Poms, Smith, Lande & Rose

[57] ABSTRACT

Disclosed herein is a fluid seal and rod wiper assembly suitable for insertion in annular groove of a piston housing packing chamber. The rod wiper assembly comprises a generally U-shaped elastomeric rod wiper having a thin lip which wipes a piston shaft and a thicker lip which provides a shoulder for accommodating an interference or compression fitting locking ring. An alternative embodiment includes a cantilever spring which is snap fit into the u-shaped compartment of the rod wiper. Another alternative embodiment includes an O-ring positioned within the u-shaped compartment defined by the rod wiper.

15 Claims, 3 Drawing Sheets

FLUID SEAL AND ROD WIPER ASSEMBLY

FIELD OF THE INVENTION

This invention relates to fluid seals and rod wiper assemblies and more particularly, this invention relates to a combined seal and rod wiper assembly suitable for insertion into an annular packing chamber.

BACKGROUND OF THE INVENTION

Historically fluid seals and rod wipers have been separate articles, since seals are designed for pressurized environments while rod wipers are directed to the exclusion of contaminants from piston rods and shafts. Combined fluid seals and rod wipers have been used in a piston rod environment to function as both a seal and as a dirt and contaminant excluders. Heretofore, these designs have suffered because when the seal is pressurized, the sealing action tended to distort the rod wiper.

Typically fluid seals are resident in an annular packing chamber or groove that is bounded by a piston rod on one side and a piston housing or cylinder which surrounds the rod. As a piston rod reciprocates or rotates about its own axis in a piston housing, lubrication fluids contact the seal and may be contained within the packing chamber. The function of the seal, in a low pressure environment, is to provide sealing ability due to the elastic interference or compression fit of the seal with the annular gland or groove in the packing chamber. This interference or compression fit of the seal with the annular groove walls may be measured in terms of the amount of deflection of the seal cross-section.

A prior art illustration of a fluid seal and rod wiper in combination is U.S. Pat. No. 3,921,991 to Beck. The Beck Patent discloses a u-shaped cross-sectional configuration for a ring-like member made from an elastomeric material such as polyurethane and other elastomeric materials, such as neoprene or natural rubber. The ring-like member D of FIG. 1 of Beck is a one piece elastomer having tails 28 of equal width, one of which acts to wipe a rod portion 16 and the other tail of the member D acting to press against the farthest axially-directed wall of the groove 18. Such a U-ring configuration member provides good relief volume and low compression force. Therefore, this one piece u-shaped cross-sectioned annular member D acts as a good rod wiper due to its ability to provide relief volume, while its sealing ability is limited. Additionally, compression setting (a failure of the seal and wiper to return to its pressure-free dimensions) is a factor that the Beck Patent does not account for.

Figures 9, 11:
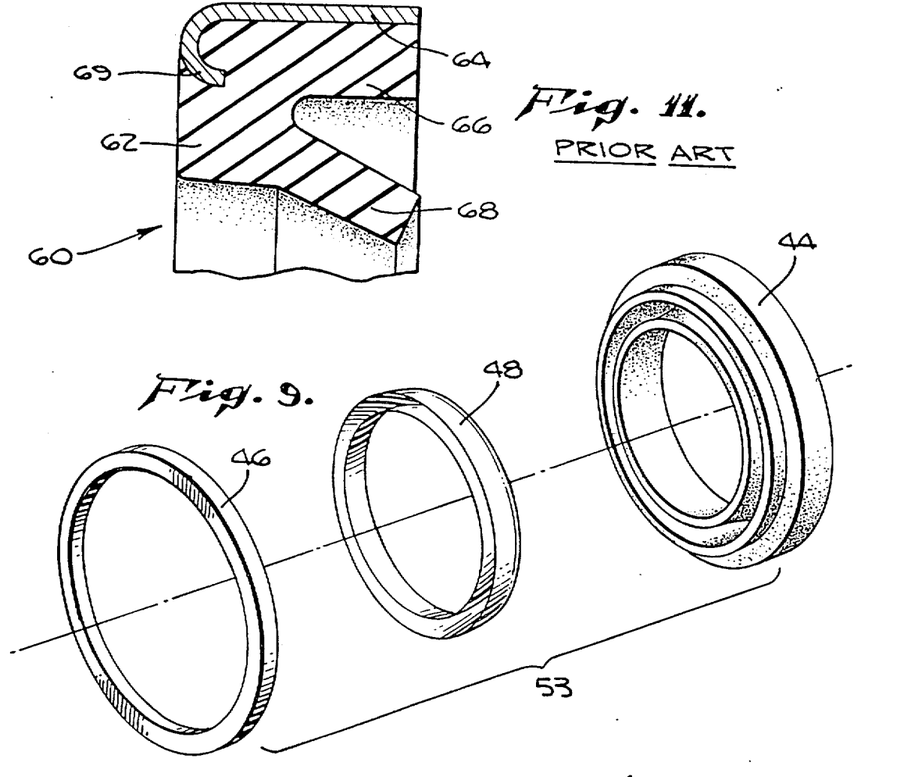
FIG. 9 shows an exploded telescoped perspective of the rod wiper assembly of this invention.
FIG. 11 is a cross-sectional view of a prior art configuration described in the Background of the Invention.

A prior art attempt to improve on the single piece seal and wiper assembly is illustrated in the wiper assembly configuration shown in FIG. 11 of this application (a metal clad wiper manufactured under the trademark MICRODOT). FIG. 11 shows a seal and rod wiper assembly 60 made from two pieces, an elastomeric urethane material rod wiper 62 and a metal plate 64. Wiper arm 68, acting as a rod wiper, abuts the piston rod and shaft. Wiper arm 66 is molded and formed to accommodate the metal ring 64, which is molded and clamped into the arm 66 by the curved head 69 of the ring 64.

As the wiper 62 is subjected to wear and pressure and temperature changes, the wiper assembly 60 is more likely to walk out of its gland within the piston housing surrounding the shaft. The wiper arm 68 transmits side loading to the mold metal ring 64 and head 69 which can cause the rod wiper arm to move out of its groove. With molded rings in the seal, the seal can begin to wiggle and walk out of its seat in the groove. Such a molded configuration reduces the forces needed to remove the ring. A molded reinforcing ring embedded within the elastomeric seal can cause the seal assembly not to follow the rod uniformly, resulting in leakage of contained fluids while allowing dirt or other contaminants into the system.

SUMMARY OF THE INVENTION

What is needed is a combination fluid seal and rod wiper assembly, operating in a low pressure environment, that has a maximum relief volume, like the wiper lip which acts as an excluder for dirt and grease, with the benefits of high compression force characteristics for seals, normally associated with O-rings.

Disclosed herein is a fluid seal and rod wiper assembly comprising an annular rod wiper having axially directed rod wiper lips and an axial-directed heel pointing in the opposite axial direction. The rod wiper has a first thin rod wiper lip with a forward lip tip biased to contact the outer surface of a piston rod, when the rod wiper assembly is placed in the annular groove of a packing chamber.

A second thicker rod wiper lip of the rod wiper is slightly biased against the outer diameter of the annular groove of the chamber. The second rod wiper lip has a substantially rectangular walled annular shoulder formed along the heel of the rod wiper. The first and second wiper lips form a u-shaped annular compartment. An annular locking or retainer ring, having a smaller inner diameter than the outer diameter of the shoulder, is compression or interference fit onto the annular shoulder of the rod wiper.

The locking ring is adapted to assist the positioning of the wiper assembly into the annular groove of the packing chamber.

An annular cantilever spring or an O-ring may be seated within the u-shaped compartment of the annular rod wiper. The cantilever spring or O-ring is snap fit into the u-shaped compartment of the annular rod wiper and is positioned to bias the first and second rod wiper lips open and against the piston rod and the annular groove of the packing chamber.

The annular locking ring may have a chamfered edge for ease of installation of the rod wiper assembly. The annular ring serves to secure the assembly in the annular groove around the piston rod and prevent the assembly from riding out of the annular groove as the rod reciprocates, rotates, or oscillates. The locking ring may be positioned at the tip of the second wiper lip or at the heel of the rod wiper.

During manufacture and assembly, the elastomeric rod wiper is shaped and machined so that the first wiper lip is relatively thin and the second wiper lip is thicker. An annular rectangularly cross-sectioned shoulder is formed on the tip or the second wiper lip of the heel of the rod wiper. The annular locking ring is then interference fit onto the rod wiper shoulder. Where a cantilever spring is included, it is snap fit within the u-shaped compartment of the rod wiper.

DETAILED DESCRIPTION OF THE PREFERRED EMBODIMENT

Figure 1:
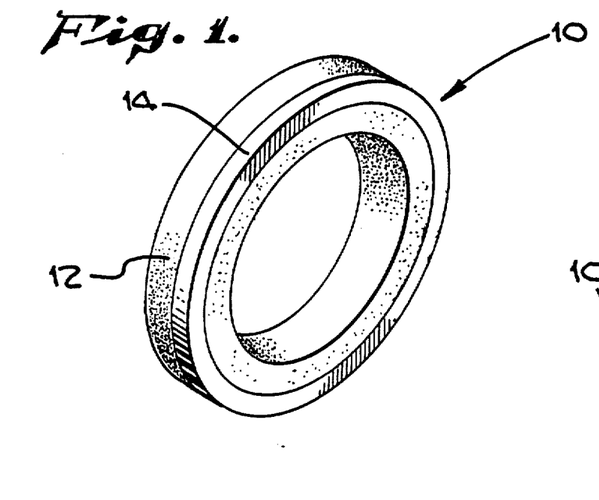
FIG. 1 is a perspective view of the preferred embodiment of the fluid seal and rod wiper assembly of this invention.
Figure 1A:
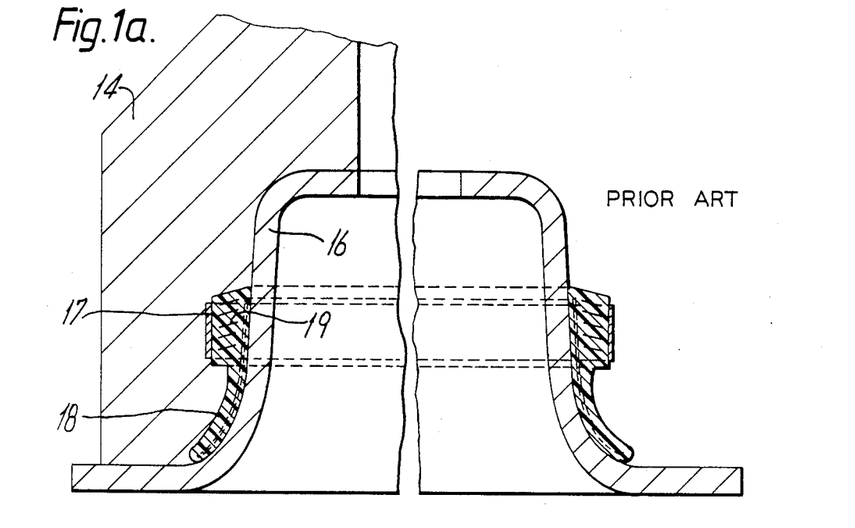
Figure 1B:
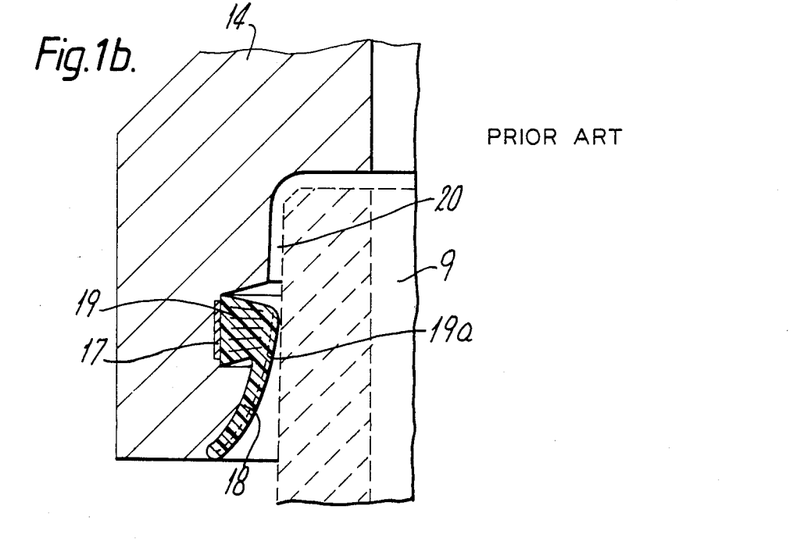
Figure 2:
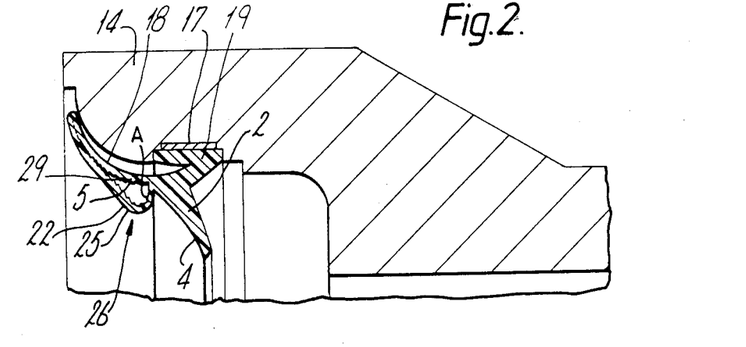
FIG. 2 is a rear perspective view of the preferred embodiment of this invention.
Figure 3:
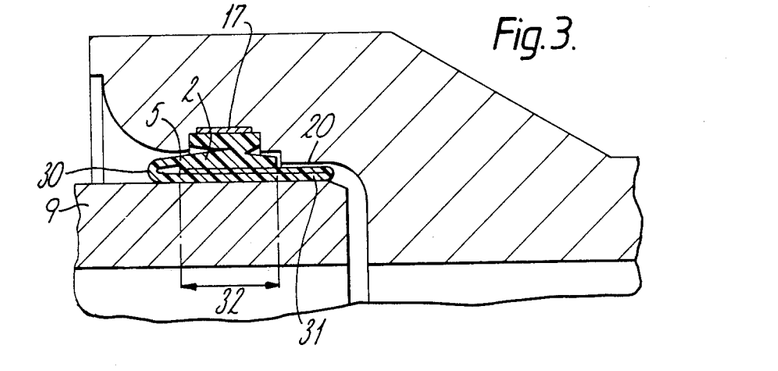
FIG. 3 is a cross-sectional view taken along lines III—III of FIG. 2.
Figure 4:
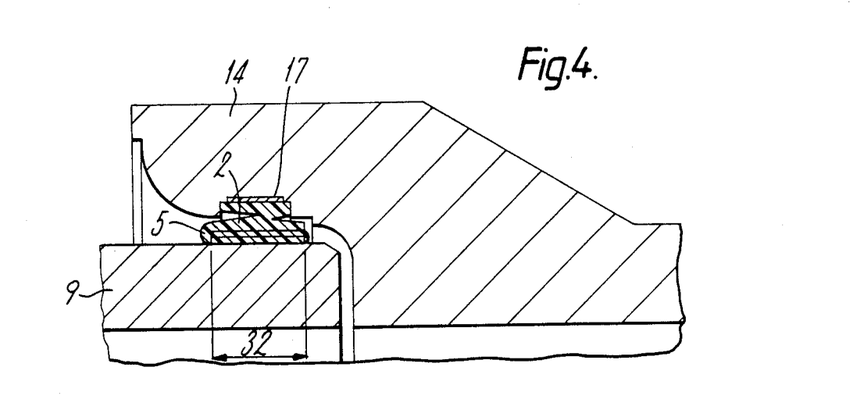
FIG. 4 is a cross-sectional view of the fluid seal and rod wiper assembly located within the annular groove of a piston housing.

With reference to FIGS. 1–4, there is shown a preferred embodiment of the fluid seal and rod wiper assembly of this invention. FIGS. 1 and 2 show the rod wiper assembly 10 which comprises an elastomeric rod wiper 12 having a locking or retaining ring 14 which surrounds the rod wiper 12. In cross section, FIGS. 3 and 4 illustrate the manner in which the locking ring 14 is secured to the elastomeric rod wiper 12. The inner diameter 16 of the ring 14 is slightly less than the outer diameter 18 of the rod wiper 12 insuring a compression interference or fit between the rod wiper 12 and the ring 14 at the shoulder wall 20 of the rod wiper 12. The metal ring 14, by being a slightly smaller diameter 16 than the outer diameter 18 of the rod wiper 12, tightens up onto the shoulder wall 20 of the rod wiper 12 and provides the interference fit which prevents the assembly 10 from walking out of its groove 34 (FIG. 4).

The elastomeric rod wiper 12 can be made from any of the elastomeric materials conventionally used for fluid seals. Suitable materials include polytetrafluoroethylene (PTFE) which may include various additives and fillers. Other types of low modulus conventional elastomeric materials such as polyester elastomers are also suitable. High durometer rubbers are also acceptable as well as ultra-high molecular weight polymers (UHMW) such as UHMW polyethylene. Also acceptable are low and high density polyethylene or urethane. The rod wiper is preferably made from a thermoplastic elastomeric material such as Zurcon ® (available from W. S. Shamban & Co.) or Hytrel ® (available from Du Pont), which has elastic but deformable characteristics. The locking ring 14 may be made from any suitably strong metal conventionally used as a seal support element. These metals topically include iron alloys such as stainless steel or other steel alloys. Low carbon steels are preferred. Aluminum alloys and other strong metals are also acceptable. Ceramics may be used provided that their structural characteristics are similar to steel or steel alloys.

The elastomeric rod wiper 12 is machined in a U-configuration, so that the rod wiper 12 has two wiper lips, 22 and 24, which form the u-shaped compartment 25. The first wiper lip 22 has a lip tip 21 at its end which functions in the preferred embodiment to wipe against the shaft 32 to exclude dirt and contaminants from entering within the compartment 25. The first wiper lip 22 is relatively thin in comparison to the thicker second wiper lip 24 so that wiper lip 22 remains agile in order to deflect and exclude contaminants from the seal 10 and the compartment 25.

Additionally the wiper lip 22 may serve to contain higher pressure fluid with the annular groove 34 which houses the fluid seal 10.

The upper second lip 24 (FIGS. 3 and 4) includes a groove which defines an annular rectangularly cross-sectioned shoulder 26 for receiving the locking ring 14 at the heel of the rod wiper 12. The ring 14 may have chamfered edges 28 (FIG. 3) to assist in the seating or insertion of the ring 14 on the shoulder wall 20 and into the groove 34. The wiper lip 24 may also have a chamfered edge 27 to allow the seal and rod wiper assembly 10 to be securely seated into the annular groove 34. It will be noted that the exposed side 29 of the rod wiper 12 is always closest to the ambient pressure environment.

Figure 5:
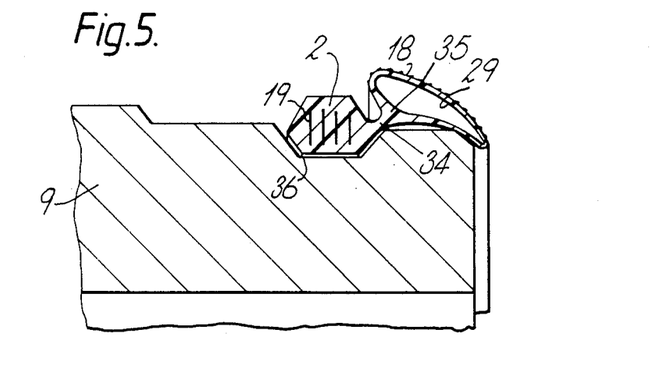
FIG. 5 is a cross-section view of an alternative embodiment of the invention.
Figure 6:
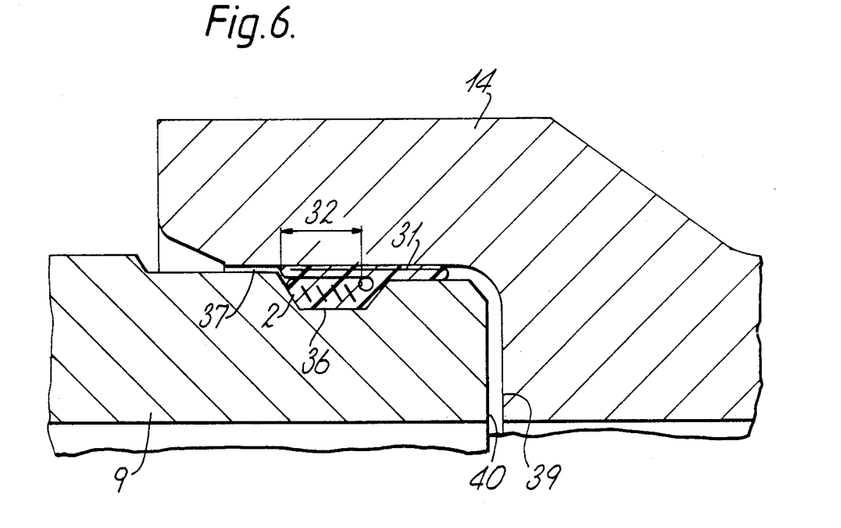
FIG. 6 is a cross-section view of the alternative embodiment surrounding a piston shaft.

Turning to FIGS. 5 and 6, an alternate embodiment shows the locking ring 15 at the tip 37 of the second wiper lip 36 of the rod wiper 40, rather than the rod wiper heel 38. The metal ring 15 may be placed, as a retaining ring, in the shoulder 42 of the rod wiper 40 exposed to the outside ambient environment. In this way, the alternative embodiment of the seal rod wiper 40 may be secured within the annular groove 34 and not ride out of the groove. This alternative embodiment directs the lips 36 and 41 towards external exposure 43 (FIG. 6) rather than having an external exposure at side 29 of the heel 38 in a manner like the embodiment of the rod wiper assembly 10 of FIGS. 1-4.

Figure 7:
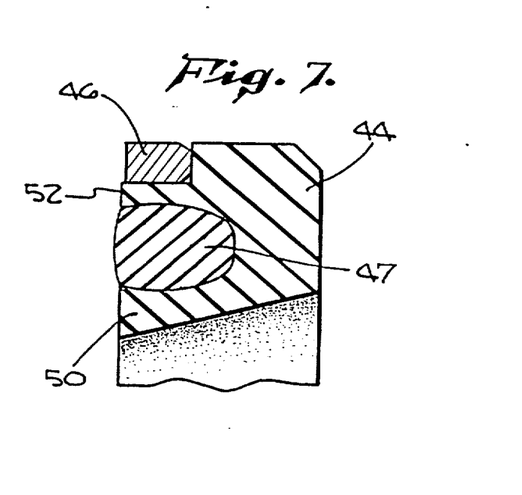
FIG. 7 is a cross-section view of a second alternative embodiment of the invention.
Figure 8:
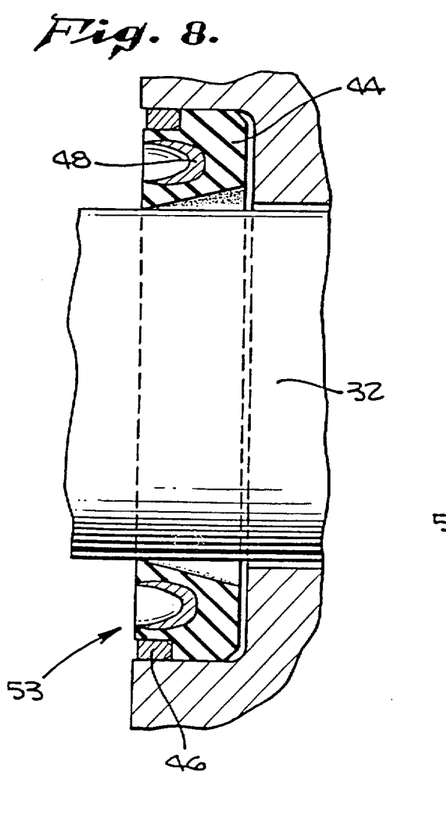
FIG. 8 is a cross-sectional view of a third alternative embodiment surrounding a piston shaft.

FIGS. 7, 8 and 9 show other embodiments of the rod wiper assembly of this invention. FIG. 7 shows a second alternative embodiment in which an O-ring 47 is used to bias the lips 50 and 52 apart so that lip 50 is brought against the surface of the shaft. The O-ring 47 may be used to counteract the tendency of the rod wiper 44 to compression set. The O-ring can be made from any of the conventional elastomer materials used to make O-rings including the various rubbers such as styrene-butadiene rubber (SBR), neoprene, butyl rubber, nitrite rubber, silicone rubber, ethylene or propylene rubber, fluorosilicone, polysufide or fluorocarbon rubbers or any other suitable elastomeric material.

Rod wiper 44 of FIG. 8 is configured like the wiper 40 of FIGS. 5 and 6, but includes a locking ring 46 as well as a cantilever spring 48. In this third alternative embodiment, spring 48 biases the first lip and second wiper lip apart so that the first wiper lip is brought into contact with the surface of the shaft 32. The cantilever spring 48 may be used to counteract the tendency of the elastomeric material rod wiper 44 to compression set. The embodiment shown in FIG. 8 faces an outside environment 53 in a direction similar to that shown in FIG. 6. It will be understood that the cantilever spring 48 may also be directed like the embodiment of the seal 10 shown in FIGS. 3 and 4.

The wiper assembly of this invention can be seen to effectively function so that the compression or interference fit between the ring 14 and the rod wiper 12 (FIG. 3 and 4) assures that the seal 10 will not slip out of its groove 34.

To manufacture the rod wiper assembly and seal, the annular rod wiper 12 is molded from an elastomeric material into a substantially u-shaped cross-sectional configuration. Preferably by machining, the two wiper lips 22 and 24 are formed of unequal thickness; lip 22, which serves as a rod wiper, is significantly thinner than lip 24. Additionally, a rectangularly cross-sectioned annular shoulder 26 is formed along the outer surface of lip 24, at the heel of rod wiper 12 as in FIG. 3, or at the forward tip of this lip as in FIG. 5. The steel annular locking ring 14, having a rectangular cross-section, is then compression or interference fit onto the shoulder 26 to form the seal 10.

Additionally during manufacture, the cantilever spring 48 may be snap-fit within the u-shaped compartment of the rod wiper 10. Likewise with the O-ring 47 of FIG. 7. FIG. 9 shows that the rod wiper assembly 53 comprises an elastomeric rod wiper 44 having a locking ring 46 which is compression fit and seats on the shoulder of the rod wiper 44. The rod wiper 44 may also have a cantilever spring 48 which is snap-fit between the wiper arms 50 and 52 (FIG. 8), or an O-ring 47 as in FIG. 7.

Figure 10:
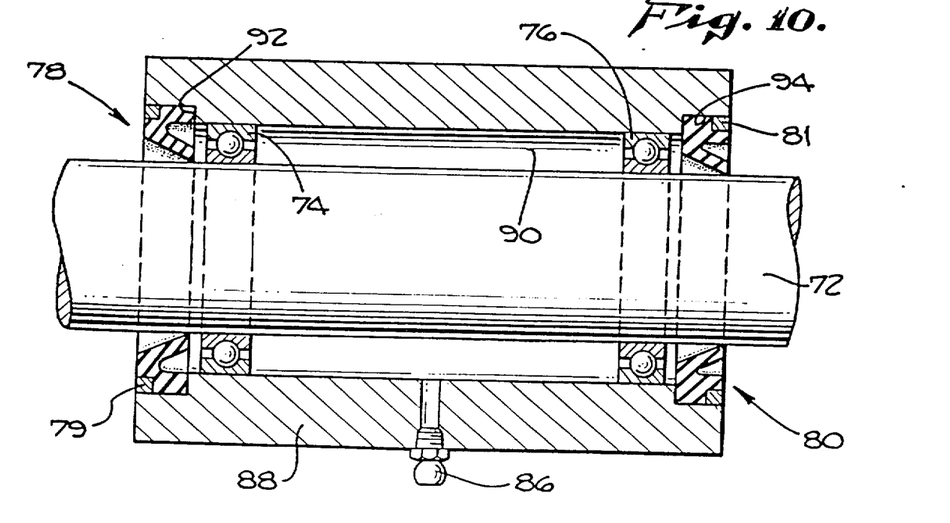
FIG. 10 shows a cross-sectional view of the wiper assembly of this invention as applied for excluding dirt and retaining grease on a bearing shaft.

FIG. 10 shows the uses of rod wiper assemblies such as the preferred embodiment 78 and the alternative embodiment 80 to exclude dirt and retain grease in a shaft 72 and bearings (74 and 76) assembly. An example of the coordinated use of said rod wiper assemblies 78 and 80 shows a shaft 72 which rotates about its own axis or reciprocates against the bearing assemblies 74 and 76. The bearings 74 and 76 collar the shaft 72 and define a compartment 90 into which grease or other lubricant may be introduced through inlet port 86. The grease is effectively contained within the compartment 90 by use of wiper assembly 78. The wiper arm of rod wiper 92 is pressed against the shaft 72 surface to prevent the inflow of contaminants and dirt and the leakage of fluid through the bearing 74. The locking ring 79 secures the wiper assembly 78 into the groove or gland defined by the piston housing 88. Grease may be allowed to bleed through the rear wiper assembly 80 by way of rod wiper 94, secured to its groove with the support of locking ring 81. When grease no longer bleeds through wiper 94, this provides an indication that new lubricant must be introduced to the compartment 90 to replenish lubricant lost due to ordinary usage of the shaft 72 and bearings 74.

It can therefore be seen that an improved rod wiper assembly can be made having good positioning characteristics within the groove 34. Although preferred embodiments have been shown, the appended claims are intended to be interpreted more broadly to embrace alternative equivalent embodiments of the invention. For example, the annular locking ring may be made from any material characterized by good stiffness which is suitable for securing the rod wiper snugly into the packing chamber. The rod wiper is a stiff but resilient material which acts as a strong seal and excluder, but which is slightly deformable to bleed and exclude dirt while retaining grease for lubricating the shaft.

What is claimed is:

1. A method of manufacturing a fluid seal and rod wiper assembly, comprising the steps of:
    molding an annular rod wiper from an elastomeric material into a substantially u-shaped cross-sectional configuration;
    forming two wiper lips, a first wiper lip relatively thin and a second wiper lip relatively thick;
    forming a rectangularly cross-sectioned annular shoulder along the outer surface of said second wiper lip; and,
    compression fitting an annular locking ring onto said shoulder.

2. The method of manufacturing a fluid seal and rod wiper assembly of claim 1, including the step of:
    snap-fitting a cantilever spring within the u-shaped compartment of the rod wiper.

3. The method of manufacturing a fluid seal and rod wiper assembly of claim 1, including the step of:
    snap-fitting an O-ring within the u-shaped compartment of the rod wiper.

4. A fluid seal and rod wiper assembly adapted to be mounted within an annular groove formed between a piston rod and a piston housing which surrounds said piston rod, said annular groove having a bottom surface, an interior side surface and an open top located radially opposite from said bottom surface, said open top allowing sealing contact between said assembly and said piston rod or piston housing, said groove further including an axially open exterior side which allows axial removal of said fluid seal and rod wiper assembly from said groove and wherein it is desirable to prevent inadvertent movement of said fluid seal and rod wiper assembly axially out of said groove via said axially open exterior side, said fluid seal and rod wiper assembly comprising:
    a U-shaped rod wiper and seal having axially directed first and second rod wiper lips, said first rod wiper lip being adapted for location at said groove top and said second rod wiper lip being adapted for location at said groove bottom, said second rod wiper lip including a walled annular shoulder and wherein each of said lips includes a lip tip;
    an annular locking ring which is compression fit onto said annular shoulder of said second rod wiper lip, said locking ring being of sufficient size to contact the groove bottom to provide an interference fit which locks said rod wiper and seal within said annular groove to prevent inadvertent movement of said assembly axially out of said groove via said axially open exterior side.

5. The fluid seal and rod wiper assembly of claim 4, including: an annular cantilever spring seated within said U-shaped compartment of said annular rod wiper;
    said cantilever spring positioned to bias said first and second rod wiper lips open and against said piston rod and said annular groove.

6. The fluid seal and rod wiper assembly of claim 5, wherein said annular locking ring has a chamfered edge.

7. The fluid seal and rod wiper assembly of claim 5, wherein the cantilever spring is made from a material selected from the group consisting of low-carbon steel and stainless steel.

8. The fluid seal and rod wiper assembly of claim 4, including:
    an O-ring seated within said U-shaped compartment of said rod wiper, said O-ring positioned to bias said first and second rod wiper lips open and against said piston rod and said annular groove.

9. The fluid seal and rod wiper assembly of claim 8, wherein said annular locking ring has a chamfered edge.

10. The fluid seal and rod wiper assembly of claim 4, wherein said annular locking ring has a chamfered edge.

11. The fluid seal and rod wiper assembly of claim 4, wherein:

said annular rod wiper is made from a resilient material selected from the group consisting of thermoplastic elastomers, rubber, ultra-high molecular weight polymers and PTFE (fluro-carbon) resin.

12. The fluid seal and rod wiper assembly of claim 4, wherein:

the annular locking ring is made from a material selected from the group consisting of a ceramic material, stainless steel, low carbon steel, aluminum and titanium.

13. The fluid seal and rod wiper assembly of claim 4, wherein:

said rectangular walled annular shoulder of said second wiper arm is positioned radially opposite said lip tip of said first wiper lip.

14. The fluid seal and rod wiper assembly of claim 4, wherein:

said annular shoulder of said second wiper lip is positioned diagonally from said lip tip of said first wiper lip.

15. The fluid seal and rod wiper assembly of claim 4, wherein the annular lock ring is made from a material characterized by good stiffness and suitable for securing the rod wiper snugly into said groove.

* * * * *

UNITED STATES PATENT AND TRADEMARK OFFICE
CERTIFICATE OF CORRECTION

PATENT NO. : 4,850,602

DATED : July 25, 1989

INVENTOR(S) : Clifford W. Goldstein, Mark A. Krzemien, and Jay Witte

It is certified that error appears in the above-identified patent and that said Letters Patent is hereby corrected as shown below:

The title page should be deleted to appear as per attached title page.

Substitute the attached drawings (FIGS. 1-11) for the present drawings (FIGS. 1-6).

Signed and Sealed this

Twelfth Day of June, 1990

Attest:

HARRY F. MANBECK, JR.

*Attesting Officer*   *Commissioner of Patents and Trademarks*

United States Patent [19]

Goldstein et al.

[11] Patent Number: 4,850,602
[45] Date of Patent: Jul. 25, 1989

[54] FLUID SEAL AND ROD WIPER ASSEMBLY

[75] Inventors: Clifford W. Goldstein, Boulder, Colo.; Mark A. Krzemien, Churubusco; Jay Witte, Decatur, both of Ind.

[73] Assignee: W. S. Shamban & Company, Santa Monica, Calif.

[21] Appl. No.: 126,558

[22] Filed: Nov. 30, 1987

[51] Int. Cl.$^4$ .............................. F16J 15/32
[52] U.S. Cl. ........................ 277/205; 277/188 A
[58] Field of Search ............... 277/205, 207 R, 121, 277/179, 181–186, 152, 153, 188 A, 188 R; 384/145

[56] References Cited

U.S. PATENT DOCUMENTS

| | | | |
|---|---|---|---|
| 2,731,284 | 1/1956 | Chambers et al. | 277/179 |
| 2,898,167 | 8/1959 | Tanner | 277/152 |
| 3,003,799 | 10/1961 | Marchiond et al. | 277/182 |
| 3,601,419 | 8/1971 | Fern | 277/205 |
| 3,848,881 | 11/1974 | Ginn | 277/181 |
| 3,901,517 | 8/1975 | Heathcott | 277/205 |
| 3,921,991 | 11/1975 | Beck | 277/205 |
| 3,957,278 | 5/1976 | Rabe | 277/205 X |
| 4,013,299 | 3/1977 | Scott | 277/188 R X |
| 4,566,702 | 1/1986 | Traub | 277/121 |

FOREIGN PATENT DOCUMENTS

| | | | |
|---|---|---|---|
| 776506 | 6/1957 | United Kingdom | 277/182 |
| 1142265 | 2/1969 | United Kingdom | 277/188 A |

*Primary Examiner*—Donald A. Griffin
*Attorney, Agent, or Firm*—Poms, Smith, Lande & Rose

[57] ABSTRACT

Disclosed herein is a fluid seal and rod wiper assembly suitable for insertion in annular groove of a piston housing packing chamber. The rod wiper assembly comprises a generally U-shaped elastomeric rod wiper having a thin lip which wipes a piston shaft and a thicker lip which provides a shoulder for accommodating an interference or compression fitting locking ring. An alternative embodiment includes a cantilever spring which is snap fit into the u-shaped compartment of the rod wiper. Another alternative embodiment includes an O-ring positioned within the u-shaped compartment defined by the rod wiper.

15 Claims, 3 Drawing Sheets